United States Patent [19]
Benson et al.

[11] Patent Number: 5,867,646
[45] Date of Patent: Feb. 2, 1999

[54] PROVIDING SECURE ACCESS FOR MULTIPLE PROCESSES HAVING SEPARATE DIRECTORIES

[75] Inventors: Max L. Benson; Darren A. Shakib, both of Redmond, Wash.

[73] Assignee: Microsoft Corporation, Redmond, Wash.

[21] Appl. No.: 679,007

[22] Filed: Jul. 12, 1996

[51] Int. Cl.$^6$ .................................................. G06F 12/14
[52] U.S. Cl. ......................................................... 395/186
[58] Field of Search ............................... 395/186, 188.01, 395/609, 726, 729; 364/222.5, 286.4, 286.5; 380/4, 23

[56] References Cited

U.S. PATENT DOCUMENTS

| | | | |
|---|---|---|---|
| 4,919,545 | 4/1990 | Yu .............................................. | 380/25 |
| 5,012,405 | 4/1991 | Nishikado et al. ...................... | 364/200 |
| 5,163,147 | 11/1992 | Orita ........................................ | 395/600 |
| 5,218,699 | 6/1993 | Brandle et al. .......................... | 395/650 |
| 5,247,676 | 9/1993 | Ozur et al. ............................... | 395/650 |
| 5,274,824 | 12/1993 | Howarth .................................. | 395/725 |
| 5,283,856 | 2/1994 | Gross et al. ............................... | 395/51 |
| 5,335,346 | 8/1994 | Fabbio ..................................... | 395/600 |
| 5,414,846 | 5/1995 | Lemble et al. ........................... | 395/650 |
| 5,446,903 | 8/1995 | Abraham et al. ........................ | 395/728 |
| 5,475,836 | 12/1995 | Harris et al. ............................. | 395/600 |
| 5,495,533 | 2/1996 | Linehan et al. .......................... | 380/21 |
| 5,513,263 | 4/1996 | White et al. .............................. | 380/44 |
| 5,544,320 | 8/1996 | Konrad ............................... | 395/200.09 |
| 5,638,448 | 6/1997 | Nguyen .................................... | 380/29 |
| 5,649,099 | 7/1997 | Theimer et al. .................... | 395/187.01 |
| 5,666,489 | 9/1997 | Fite, Jr. et al. ....................... | 395/200.5 |
| 5,671,354 | 9/1997 | Ito et al. ............................. | 395/187.01 |

OTHER PUBLICATIONS

Deitel, "An Introduction to Operating Systems", Second Ed., Addison–Westley Pub Co, pp. 400–401 and 534–539, Feb. 1990.

Tanenbaum, "Modern Operating Systems", Prentice Hall, pp. 180–199 and 200–203, 1992.

Shirley, John and Rosenberry, Ward, "Microsoft RPC Programming Guide", O'Reilly & Associates, 1995.

Kramer, Matt, "Baranof's MailCheck 2.6 Delivers Improved Tools", PC Week, Sep. 11, 1995, Ziff–Davis Publishing Company 1995.

Frenkel, Gary, "cc:Mail View Keeps an Eye on Your Messaging System", Network Computing, Jun. 1, 1995, CMP Publications, Inc., 1995.

*Primary Examiner*—Albert DeCady
*Assistant Examiner*—Stephen C. Elmore
*Attorney, Agent, or Firm*—Workman, Nydegger & Seeley

[57] ABSTRACT

A variety of processes, e.g., electronic mail, word processing, database applications, etc., reside on a system, e.g., an operating system. Independent levels of security are maintained for the different processes without requiring the user to pass a security test to gain access to each process. The system includes a directory of system identifiers assigned to users. Each process includes a directory of process-specific identifiers for users of that process. The system identifiers and process identifiers are associated in a predetermined manner. Therefore, a user may gain access to a process only when the user's system identifier is associated with the desired process-specific identifier.

14 Claims, 4 Drawing Sheets

PROVIDING SECURE ACCESS FOR MULTIPLE PROCESSES HAVING SEPARATE DIRECTORIES

BACKGROUND OF THE INVENTION

The invention relates to providing secure access to multiple processes running on a computer system, where each process has a separate directory.

As more important and confidential data is created, processed, and stored electronically, the security needs for the processes and information have increased. Additionally, in the present computing environment, a single user needs access to numerous processes. For example, in a client/server system, a user may need access to processes (also known as resources) such as electronic mail, word processing, database applications, and graphics applications. Typically, a user will have different access levels (also known as permissions) for the different processes.

A current technique for operating in this environment is to have a separate directory of authorized users and security system associated with each process, as shown in the block diagram of FIG. 1. A user, e.g., user1, obtains access to a first process 1, e.g., an operating system, by entering a first identifier 2, e.g., SYSID1. The first identifier is checked against a directory 3 of valid users for the operating system. If the use-entered identifier is valid, user1 must also pass a security system 4 check.

In order for user1 to access another process 5, e.g., process P1, user1 must enter a process-specific identifier 6a, e.g., P1ID1, which is checked against a process-specific directory 7a. Also, user1 must pass a process-specific security system 8a check. These steps are repeated by the user in order to obtain access to each of the processes available on the computer system.

This process-specific access technique presents several problems. First, the processes have separate directories containing the valid identifiers for the respective processes. Typically, the directories do not use the same identifier for a single user. In the example above, user1 must use SYSID1 to gain access to the system, and then use a process-specific identifier, e.g., P1ID1, obtain access to each process. The directories are independent and must be managed separately.

Typically, a user is required to pass a different security test (e.g., know a different password) for each process. A user may forget one or more of the needed process passwords, wasting valuable time. This may induce the user to write down the list of passwords. This list may be susceptible to theft or copying.

SUMMARY OF THE INVENTION

In the present invention, a multi-process system, running on a computer system, is provided where independent levels of security for different processes are maintained, while the user must pass as few as one explicit security test. The various process-specific directories are linked so that a user can pass a single security test and obtain the appropriate access to each of the processes on the computer system.

In one embodiment, a first process is an operating system which includes an associated security system for controlling access to the operating system. The operating system includes a directory of system identifiers which represent the authorized users. Therefore, when a user attempts to access the operating system, the user must have an authorized system identifier and must pass an explicit security test.

Additional processes (or resources) are available on the operating system. Each resource includes a directory containing a list of resource-specific identifiers that are authorized access to the resource. The system directory and resource-specific directories are linked (e.g., by a cross-reference table), associating the system identifiers with the different resource-specific identifiers. In the example above, SYSID1 is linked with R1ID1, R2ID2, . . . , RNID1.

When a user obtains access to the operating system using a system identifier and attempts to access a resource by using a resource-specific identifier, the operating system first determines whether the user (known to the system by a system identifier) is allowed to use the resource-specific identifier by comparing the linked directories. If the appropriate cross-reference between system identifier and resource-specific identifier is found, the operating system then determines the permission level for the resource-specific identifier.

In one embodiment, the only explicit security test is associated with obtaining access to the operating system. In another embodiment, additional, resource-specific security systems may be added to provide enhanced security for those resources requiring an added level of security.

The present secure access technique may be implemented in a variety of computing systems, including client/server systems. The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages will become apparent from the following description, including the drawings, and from the claims.

DESCRIPTION OF THE PREFERRED EMBODIMENTS

Figure 1:
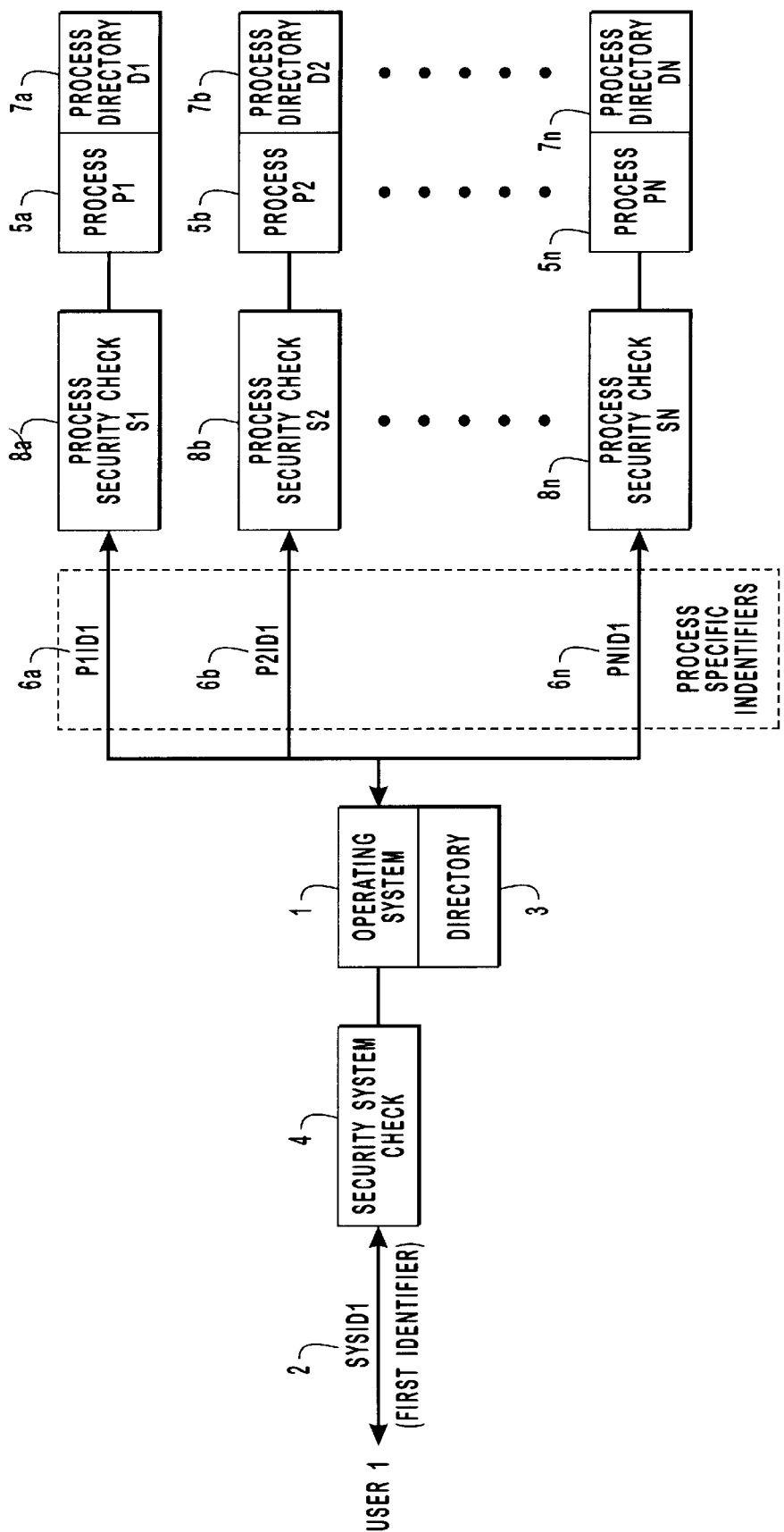
FIG. 1 is a block diagram of a prior art access system.
Figure 2:
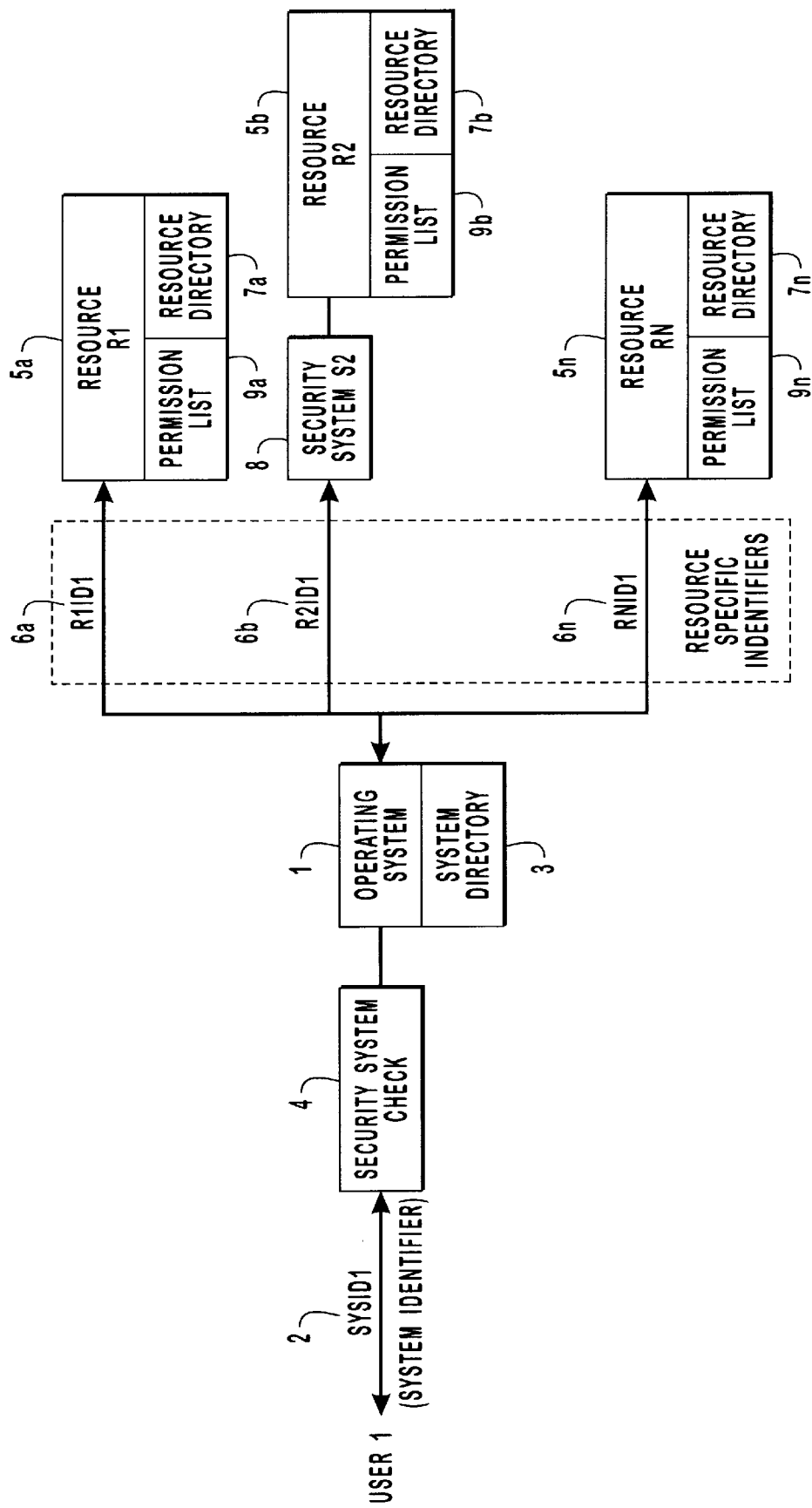
FIG. 2 is a block diagram of a secure access system.

A block diagram of a multi-process system, running on a computer system with secure access, is shown in FIG. 2. In one embodiment, the system includes a first process, e.g., an operating system 1 for a client/server system. The client/server system may include multiple servers linked together. A user of operating system 1, e.g., user1, is assigned a system identifier 2, e.g., SYSID1, to obtain access to the system. Valid system identifiers are stored in system directory 3. The operating system has an associated security system 4 to control access to the system.

Various additional processes 5a,5b,5n, also known as resources, e.g., R1, R2, . . . , RN, are provided on the operating system. The resources may include a wide variety of application programs such as electronic mail (e.g., Microsoft® Exchange), database applications, word processing applications, graphics applications, and others. Each resource 5a, 5b, 5n has a resource directory 7a, 7b, 7n which includes a list of all authorized users for that resource, represented by a resource-specific identifiers 6a, 6b, 6n e.g., RNID1. The identifiers for a given resource may have a different format from the identifiers of other resources and from the system identifier 2. For example, system user, Bill A. Jones, may have a system identifier of jonesba, a first resource identifier of BAJ, and a second resource identifier of BILL A. JONES.

A permission list 9a, 9b, 9n is part of or associated with each resource directory 7a, 7b, 7n. Permissions designate the operations or level of access that a given resource identifier has for that resource. For example, in a database resource, a first resource-specific identifier may have only permission to read database records, while a second resource-specific identifier may have permission to create, modify, and read database records.

Secure access is provided for each resource 5a, 5b, 5n separately, without requiring a user to pass a security system test for each resource, by using the linked directories 3 and 7a, 7b, 7n. This is accomplished by checking the requested resource directory 7a, 7b, 7n and permission list 9a, 9b, 9n before granting a user (known to the system by a system identifier) access to the resource 5a, 5b, 5n (by using a resource-specific identifier 6a, 6b, 6n). This secure access technique not only eases the burden on the system/resource users in gaining access to resources but also eases the burden on resource users in generating distribution lists, and on system/resource administrators in managing changes in relationships between system identifiers and resource-specific identifiers.

Figure 3:
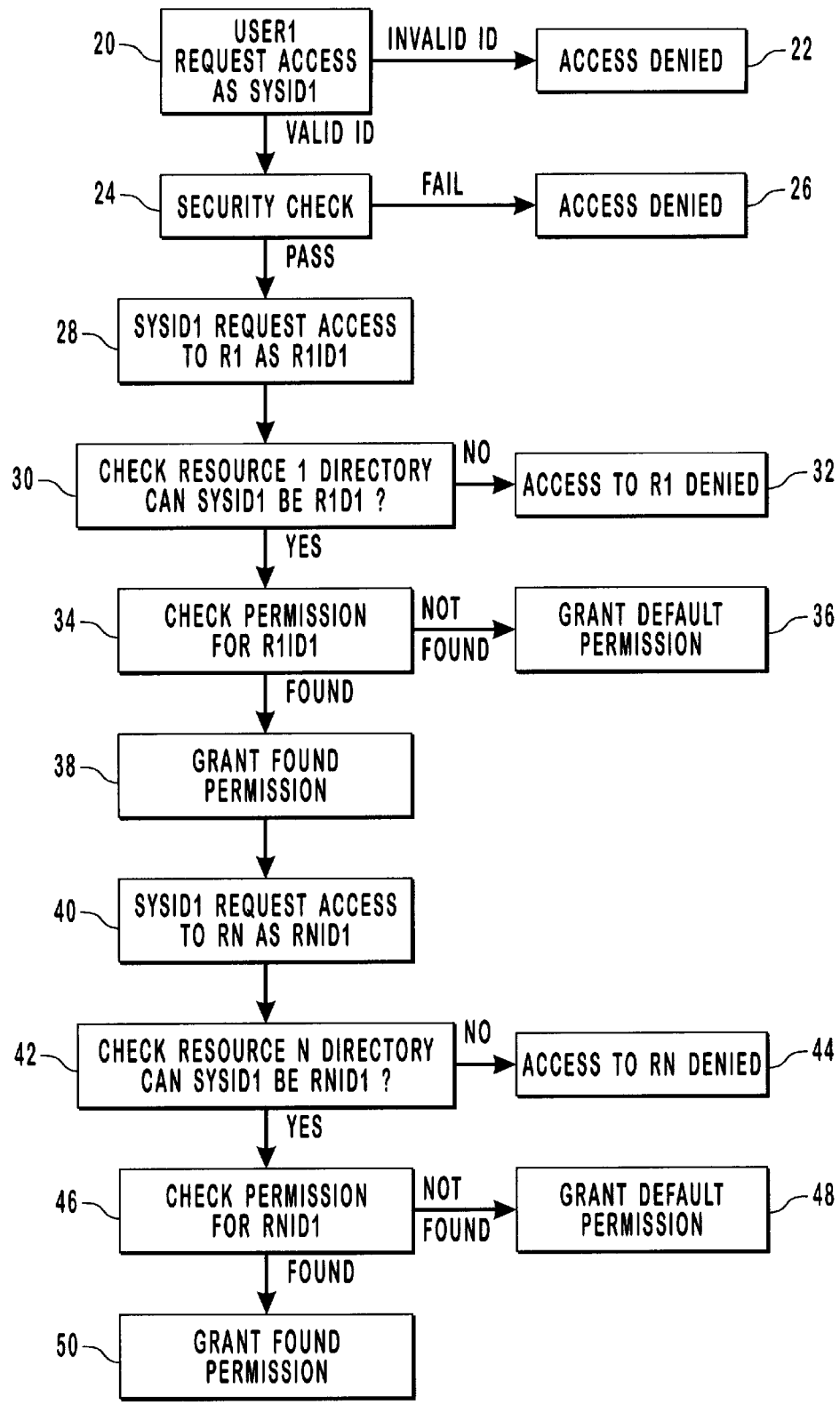
FIG. 3 is a flow chart of obtaining access to resources on a secure access system.

A flow chart of the secure access technique, using the exemplary designations shown in FIG. 2, is shown in FIG. 3. First, user1 requests access to system 1 at step 20 by entering a system identifier 2, SYSID1. The system checks system directory 3 to determine whether SYSID1 is a valid system identifier 2 on the system. If SYSID1 is not a valid system identifier, user1 is denied access to the system at step 22. If SYSID1 is a valid identifier, at step 24 user1 is required to pass a security test from security system 3 assigned for user1. If the security test is not passed, access to the system is denied at step 26. If the security test is passed, user1 is granted access to system 1 as SYSID1.

User1 next requests access to a resource 5, e.g., resource R1, at step 28. User1 enters her R1 resource-specific identifier 6a, e.g., R1ID1. System 1 checks the link between system directory 3 and resource directory 7a for R1 at step 30 to determine whether SYSID1 has permission to be resource identifier R1ID1 on resource R1. In one embodiment, this link is achieved using a cross-reference table that associates system identifiers with resource-specific identifiers found in the resource directories.

If SYSID1 is not allowed to be R1ID1 on R1, then user1 is denied access to R1 at step 32. If SYSID1 is allowed to be R1ID1 on R1, then permission for R1ID1 in R1 is determined from permission list 11 at step 34. If no permissions for R1ID1 are found in the permission list of R1, then R1ID1 is assigned a default permission for R1 at step 36. If a permission for R1ID1 is found in the permission list, then R1ID1 is granted that permission at step 38.

As shown in FIG. 3, user1 may seek access to other resources 5n, e.g., resource RN on system 1, by following similar steps as required for access to resource R1, i.e., by following steps 40 through 50. Therefore, a user may obtain access to operating system 1 and one or more resources 5a, 5b, 5n while being required to pass as few as one explicit security test. However, due to the linkage of the system identifiers and resource-specific identifiers, the user is allowed access only to those resources for which access has been predetermined. Additionally, the permission level for that user on different resources is controlled by resource-specific permission lists.

An extra level of security may be added to one or more resources 5a, 5b, 5n by adding a security system 8 for the selected resources. For example, in FIG. 2, resource R2 has an explicit security system S28 which a user must pass in order to gain access to resource R2.

Figure 4:
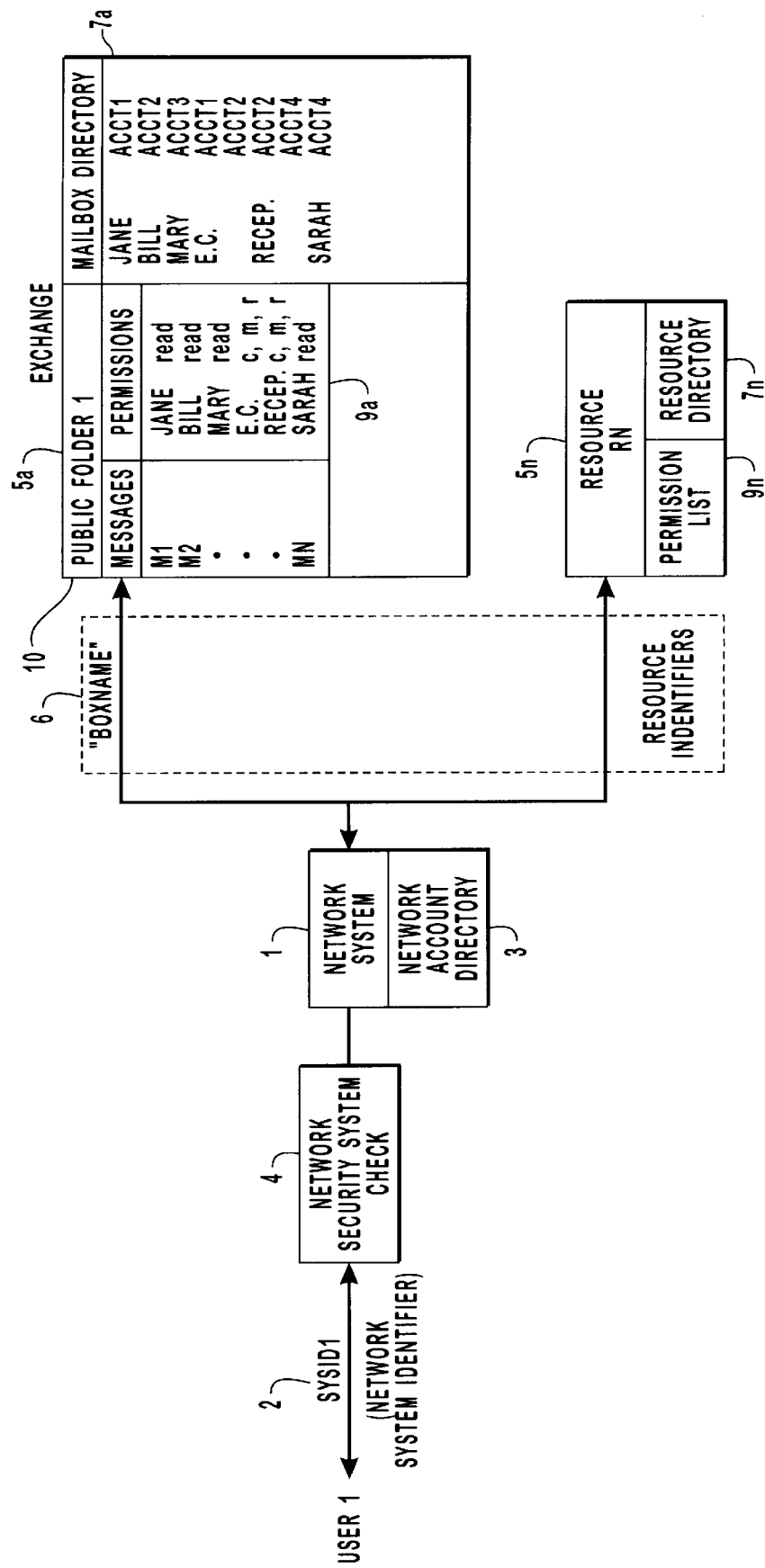
FIG. 4 is a block diagram of an embodiment of a secure access system.

In one embodiment of the invention, a client/server system is provided using Microsoft® NT operating system, and one of the resources is Microsoft® Exchange. A block diagram of this configuration is shown in FIG. 4. The NT operating system 1 has an integral NT security system 4. Also, the NT system has a network account directory 3 that includes a listing of all network account identifiers 2 for the NT system, e.g., acct1=Jane Doe, acct2=Bill Smith, acct3= Mary Joe, . . . , acctn= . . .

Microsoft® Exchange is provided on the NT system as a resource 5a. In Exchange, users are identified as mailboxes. Therefore, the resource-identifier 6 for Exchange is a mailbox name. Exchange includes a mailbox directory 7a that includes a list of valid mailbox names, e.g., "Jane", "Bill", "Mary", "Events Coordinators", and "Receptionist". In fact, mailbox directory 7a is a database having various fields including the display name of mailboxes, the e-mail address of mailboxes, information from NT that defines the access of NT identifiers 2 to Exchange mailboxes, mailbox (user) phone numbers, mailbox (user) supervisor, etc. An administrator of the Exchange mailbox directory determines which NT identifiers may operate on Exchange as a specific Exchange mailbox (i.e., a resource-specific identifier). For example, acct1 (Jane Doe) can operate on Exchange as "Jane" and "Events Coordinator", acct2 (Bill Smith) can operate on Exchange as "Bill", "Events Coordinator", and "Receptionist", and acct3 (Mary Joe) can operate on Exchange only as "Mary".

Exchange may include numerous public and private folders 10, e.g., Public Folder 1. Folder 1 includes a plurality of messages, M1, M2, . . . , MN. Folder 1 has an associated permission list 9a. "Jane", "Bill", and "Mary" all have only permission to read messages in Folder 1. "Events Coordinator" and "Receptionist" each have permission to create, modify, and read messages in Folder 1.

Secure access for Exchange is provided by the link between the NT identifiers 2 and Exchange identifiers 6 found in Exchange directory 7a. Additionally, the users of Exchange only operate using Exchange identifiers 6. For example, if a user (having a mailbox) wants to create a distribution list for an Exchange message, the user need only identify the Exchange mailboxes (resource-specific identifiers) for the distribution list, and not the NT identifiers (system identifiers). All security is controlled transparently through the NT security system and Exchange administrator.

A system user may have access to more than one mailbox in Exchange. In the present example, acct1 (Jane Doe) has access to Exchange as both "Jane" and "Events Coordinator". Later, if event coordinator duties are shifted to Mary Joe, the Exchange mailbox administrator merely updates the directory by deleting acct1 and adding acct3 from access to the "Events Coordinator" mailbox; Jane and Mary Joe do nothing. Also, Jane Doe and Mary Joe can maintain their own personal message correspondence (using JANE and MARY mailboxes, respectively) free of the "Events Coordinator" mailbox.

In another example, Bill Smith may also be a receptionist and the permission levels for "Bill" and "Receptionist" on Exchange may be different. When another receptionist is added (e.g., Sarah Jones=acct4), the Exchange administrator updates the Exchange directory 7a by adding acct4 to access for "Receptionist". Therefore, Sarah Jones, acting in Exchange as "Receptionist" has the proper permissions for a receptionist and a separate set of permissions when she acts in Exchange as "Sarah".

In operation, a user, e.g., Jane Doe, requests access to the NT system by entering her system identifier 2, acct1. The NT system searches its directory 3 and finds acct1 is a valid system user. NT security system 4 then provides a security test, e.g., requests a password. If Jane Doe enters the correct password, she is granted access to the NT system.

Jane Doe next requests access to Folder 1 on Exchange as "JANE". The NT system then "impersonates" Jane Doe (i.e., acct1) and polls the NT system to determine whether acct1 can be "JANE" on Exchange. Exchange responds to the NT system that acctl can be "JANE" and also provides the "JANE" permission level for Folder 1, e.g., read only. Jane Doe may now read the messages in Folder 1 as mailbox "JANE". As in FIG. 2, resource RN 5n represents other resources on the system, with its associated permission list 9n and resource directory 7n.

Other embodiments are within the scope of the following claims. Only a very few of the possible embodiments of the invention have been described above.

What is claimed is:

1. In a computer system having an operating system where users are assigned specific user IDs and where access to the computer system is controlled by a security system of the operating system that checks the validity of a password entered for a specific user ID, a method of providing secure access to subsequent processes or resources on the computer system without further challenging the user ID through the use of other password, comprising the steps of:
   validating the identity of a user through the security system of the operating system by a security check requiring a user to enter a user ID and password, such that when the security check is complete the operating system allows said user entry onto the system and associates said user ID with said user;
   requesting access, by said user, to a subsequent resource or process on the computer using a second user identifier having a format specific to said subsequent resource or process; and
   performing a security check with out recourse to other passwords by determining if said user has privilege to access said subsequent resource or process by,
   obtaining said User ID and determining whether said user ID can act as said second user identifier,
   and if said user ID can act as said second user identifier, then granting access to subsequent resource or process,
   and if not then denying access to said subsequent resource or process.

2. The method of claim 1, wherein determining whether said user ID can act as said second user identifier comprises checking a cross-reference table in which user IDs are associated with second user identifiers.

3. The method of claim 1, wherein the system comprises a client/server network.

4. The method of claim 1, wherein the subsequent resource or process comprises an electronic mail messaging system.

5. The method of claim 1, further comprising validating a second security test before granting access to the subsequent resource or process.

6. The method of claim 1, wherein the user ID and second user identifier are different.

7. The method of claim 1, further comprising associating an access level with a the second user identifier to identify the privileges that said user has with respect to the subsequent resource or process.

8. In a computer system having an operating system where users are assigned specific user IDs and where access to the computer system is controlled by a security system of the operating system that checks the validity of a password entered for a specific user ID, as an article of manufacture, a computer program system without further challenging the user ID through processes or resources on the computer system without further challenging the user ID through the use of other passwords comprising:
   computer readable medium having computer executable instructions embodied thereon comprising:
   means for validating the identity of a user through the security system of the operating system by a security check requiring a user to enter a user ID and password, such that when the security check is complete, the operating system allows said user entry onto the system and associates said user ID with said user;
   means for requesting access, by said user to a subsequent resource or process on the computer using a second user identifier having a format specific to said subsequent resource or process; and
   means for performing a security check without recourse to other passwords by determining if said user has privilege to access said subsequent resource or process by,
   obtaining said user ID and determining whether said user ID can act as said second user identifier,
   and if said user ID) can act as said second user identifier, then granting access to said subsequent resource or process,
   and if not, then denying access to said subsequent resource or process.

9. The computer program product of claim 8, wherein means for determining whether said user ID can act as second user identifier comprises means for using a cross-reference table in which user IDs are associated with second user identifiers.

10. The computer program product of claim 8, wherein the system comprises client/server network.

11. The computer program product of claim 8, wherein the subsequent resource or process comprises an electronic mail messaging system.

12. The computer program product of claim 8, further comprising means for validating a second security test before granting access to the subsequent resource or process.

13. The computer program product of claim 8, wherein the user ID and second user identifier are different.

14. The computer program product of claim 8, further comprising means for associating an access level with the second user identifier to identify the privileges that said user has with respect to the subsequent resource or process.

* * * * *

UNITED STATES PATENT AND TRADEMARK OFFICE
CERTIFICATE OF CORRECTION

PATENT NO. : 5,867,646

DATED : February 2, 1999

INVENTOR(S) : Max L. Benson, Darren A. Shakib

It is certified that error appears in the above-identified patent and that said Letters Patent is hereby corrected as shown below:

Col. 1, ln. 26: before "identifier" change "use-entered" to --user-entered--

Col. 4, ln. 35: after "acctn=..." insert --.--

Col. 5, ln. 66: after "said" change "User" to --user--

Col. 6, ln. 20: after "level with" delete [a]

Col. 6, ln. 28: after "program" insert --product for providing secure access to subsequent processes or resources on the computer--

Col. 6, ln. 38: after "associates" insert --by--

Signed and Sealed this

Seventeenth Day of October, 2000

Attest:

Q. TODD DICKINSON

*Attesting Officer*  *Director of Patents and Trademarks*